United States Patent [19]

Fernsler et al.

[11] 4,127,875
[45] Nov. 28, 1978

[54] INRUSH CURRENT START-UP CIRCUIT FOR A TELEVISION RECEIVER

[75] Inventors: Ronald E. Fernsler; John C. Peer; David W. Luz, all of Indianapolis, Ind.

[73] Assignee: RCA Corporation, New York, N.Y.

[21] Appl. No.: 750,632

[22] Filed: Dec. 15, 1976

[51] Int. Cl.² .............................................. H04N 3/18
[52] U.S. Cl. .................................................. 358/190
[58] Field of Search ......................................... 358/190

[56] References Cited
FOREIGN PATENT DOCUMENTS 3,490  6/1967  Japan ........................................ 358/190

Primary Examiner—Richard Murray
Attorney, Agent, or Firm—Eugene M. Whitacre; Paul J. Rasmussen; Joseph Laks

[57] ABSTRACT

A start-up circuit for a television receiver includes a circuit for rectifying the AC line voltage and a filter for providing a smoothed DC voltage. When the receiver is turned on, an initial interval exists in which inrush current flows into the filter. A magnetically coupled winding of an inductor in the path of the inrush current develops an alternating current potential during the initial interval. This potential is rectified and provides a start-up operating voltage for the television receiver.

11 Claims, 1 Drawing Figure

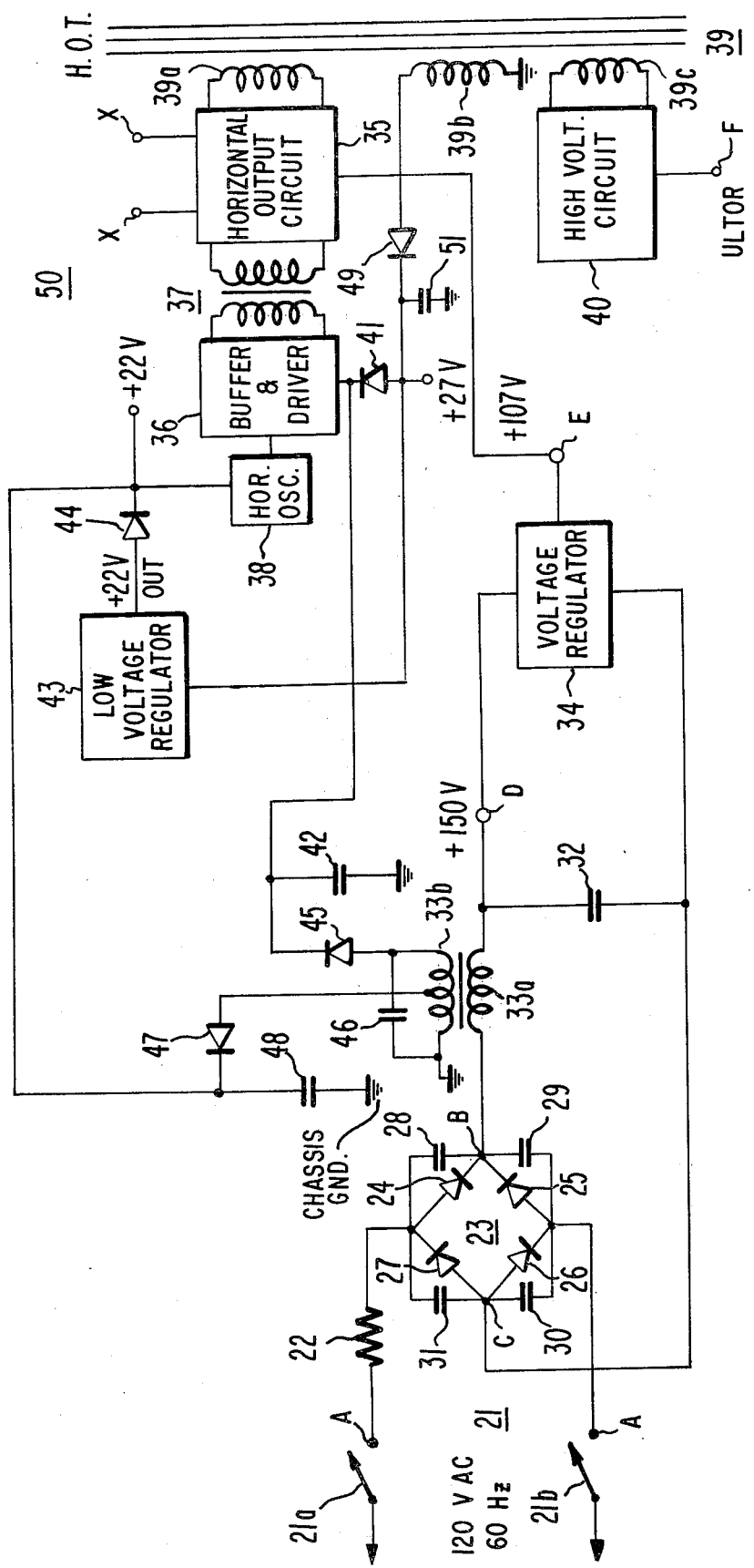

INRUSH CURRENT START-UP CIRCUIT FOR A TELEVISION RECEIVER

BACKGROUND OF THE INVENTION

This invention relates to start-up power supplies for television receivers.

Rectified AC line voltage is filtered and regulated to provide a high B+ operating voltage to the television receiver. The high B+ may be coupled, for example, to the horizontal deflection circuit for generating scanning current in the horizontal deflection winding. Low B+ voltages must also be provided as operating voltages to various receiver circuits, such as the oscillator and driver stages of the horizontal deflection circuit itself.

In U.S. Pat. No. 3,980,821, granted to J. C. Peer et al., there is disclosed a high voltage protection circuit which provides a continuous low B+ operating voltage to the horizontal oscillator of a horizontal deflection circuit. The low B+ is derived from the steady-state voltage that is available across a secondary winding coupled to a rectified AC line choke input filter. If the choke shorts, the low B+ voltage decreases to an unuseable level.

Often it is desirable to derive the low B+ voltages from a secondary winding of the horizontal output transformer after the horizontal deflection circuit has begun to function. However, during the initial start-up interval after the receiver is turned on, no low B+ voltages are generated by the horizontal output transformer to operate the oscillator and driver stages of the horizontal deflection circuit. Another source of low B+ voltage must be provided during this initial start-up interval.

One method of providing a low B+ start-up voltage, as disclosed in U.S. Pat. No. 3,621,134, granted to R. J. Waring, couples a regulated switching transistor in series with the high B+. The low B+ is obtained at the emitter of the switching transistor. The base-emitter of the transistor becomes reverse biased after the initial start-up period. However, in such an arrangement, the low B+ is not isolated from the main power supply and would be unsuitable for driving circuits which are isolated from the main power supply.

Another method, as disclosed in U.S. Pat. No. 3,947,632, granted to R. J. Giger et al., couples a secondary winding to the degaussing coil of a television receiver. A thermistor, in series with the degaussing coil, is of low resistance during initial turn-on of the receiver, and a relatively large AC potential is developed in the secondary winding for generating a start-up voltage. While an isolated voltage can be derived from the secondary winding, the winding structure is relatively uneconomical.

SUMMARY OF THE INVENTION

A start-up circuit for a television receiver has a rectifier responsive to a source of first alternating current voltage. A filter coupled to the rectifier provides a first direct current voltage. During an initial interval, an inrush current flows in the filter. An inductor coupled in the path of the inrush current develops a second alternating current voltage during the initial interval.

A circuit, which is responsive to the second alternating current voltage, develops a second direct current voltage suitable for operating a deflection circuit during the initial interval.

BRIEF DESCRIPTION OF THE DRAWING

The FIGURE illustrates an embodiment of the invention.

DESCRIPTION OF THE INVENTION

In the FIGURE, a source of alternating current potential, not shown, is coupled to terminals A—A by means of sections 21a and 21b of a power on-off switch 21. Coupled to the upper terminal A is a current limiting resistor 22. Resistor 22 is coupled to a full-wave rectifier bridge 23 comprising diodes 24-27 and bypass capacitors 28-31. A pulsating direct current potential is derived at an output terminal B.

Output terminal B is coupled to one end of a filter capacitor 32 through a first inductor 33a, the function of which will be further described. The other end of filter capacitor 32 is coupled to a return terminal C of bridge rectifier 23 at the junction of diodes 26 and 27.

Filtered direct current potential illustratively of +150V is available at a terminal D. Terminal D is coupled to a voltage regulator 34 from which a high B+ voltage, such as +107 volts, is developed at a terminal E. The +107 volts at terminal E is coupled to a horizontal output circuit 35 of a horizontal deflection circuit 50 for supplying horizontal scanning current at terminals X—X to a horizontal deflection winding, not shown. Drive signals repeating at the horizontal frequency are coupled to the horizontal output circuit from a buffer and driver circuit 36 through a coupling transformer 37 in response to horizontal rate input signals developed by a horizontal oscillator 38.

Horizontal output circuit 35 is coupled to a primary winding 39a of a horizontal output transformer 39. Trace and retrace voltages developed in primary winding 39a are coupled to secondary windings 39b and 39c of transformer 39. A high voltage circuit 40 is coupled to secondary winding 39c for providing a high voltage potential at a terminal F to the ultor of a television kinescope, not shown.

Voltages developed across secondary winding 39b are rectified during each deflection cycle by a diode 49 and filtered by a capacitor 51. A low B+ direct voltage operating voltage for use by various television receiver circuits, not shown, is obtained at the cathode of diode 49 and is shown illustratively in the FIGURE as +27 volts. The cathode of diode 49 is coupled to a low voltage regulator 43 for developing a second low B+ operating voltage at an output terminal, the voltage shown illustratively in the FIGURE as +22 volts. The +22 volt operating voltage is coupled to horizontal oscillator 38 through a diode 44. The +27 volt operating voltage is coupled to buffer and driver circuit 36 through a diode 41.

During steady-state operation, the voltage developed in each deflection cycle across secondary winding 39b of horizontal output transformer 39 provides the +22 volt and +27 volt operating voltages for the horizontal oscillator and the buffer and driver circuits, respectively. During initial turn-on of the television receiver, horizontal deflection circuit 50 is inoperative, and thus, the +22 and +27 volt operating voltages cannot be developed from the horizontal deflection circuit. To supply the low B+ direct voltages during this initial turn-on interval, a second inductor 33b is magnetically coupled to inductor 33a.

Initially, filter capacitor 32 is discharged. Upon turn-on of the receiver, a large pulsating inrush current flows through bridge rectifier 23 and charges capacitor 32. The inrush current peak value is limited only by resistor 22. As an illustrative embodiment of the FIGURE, resistor 22 has a value of 3.9 ohms and capacitor 32 a value of 800 microfarads. A peak inrush current of 35 amps can be developed if turn-on occurs at the peak of the AC line voltage. The peaks of the pulsating inrush current exponentially decay to their steady-state value after several 120 Hz cycles, during which time capacitor 32 charges to its steady-state value. Typically, about 5 cycles are required to attain a steady-state condition for the above-given component values.

The large inrush current available during the initial turn-on interval flows through inductor 33a and develops an alternating current potential across the inductor. This alternating current potential is coupled magnetically through inductor 33b, rectified by diode 45 and filtered by a capacitor 42. The cathode of diode 45 is coupled to the cathode of diode 41. A horizontal bypass capacitor 46 is coupled across inductor 33b.

The component values for inductors 33a, 33b and capacitor 42 are selected to provide a direct current operating voltage at the cathode of diode 45 of just sufficient a magnitude such that, during the initial turn-on interval of inrush current, oscillator 38 and buffer and driver 36 will operate properly. After the initial interval, during steady-state operation, the rectified operating voltage generated by deflection circuit 50 through a secondary winding 39b will reverse bias diode 45. The +27 volt operating voltage will be provided by deflection circuit 50 instead of by inductors 33a and 33b. The value of capacitor 51 is large relative to the value of capacitor 42, since capacitor 51 must provide good filtering for the +27 volt loads during the steady-state interval. Diode 41 prevents heavy loading of inductor 33b by the initially discharged filter capacitor 51.

The +22 volt operating voltage is also obtained during the initial turn-on interval by means of an appropriately placed tap terminal on inductor 33b. The alternating current potential developed at the tap terminal is rectified by a diode 47 and filtered by a capacitor 48. The cathode of diode 47 is coupled to the cathode of diode 44. As with diode 45, diode 47 is reverse biased after the steady-state +22 volt operating voltage is obtained at the cathode of diode 44.

Illustrative component values for inductors 33a and 33b are: 60 turns of #24 gauge copper wire for inductor 33a; 264 turns of #34 gauge copper wire for inductor 33b. A ¼ inch long magnetic core is made of laminated steel and is of ¼ inch diameter. The tap ratio for inductor 33b is 3:4.

It is desirable to begin operation of horizontal oscillator 38 and buffer and driver 36 during the initial turn-on interval rather than later when the steady-state condition has been obtained. In the steady-state condition, the voltage at terminal E, when deflection circuit 50 begins to operate, is near its full-valued potential of +107 volts. If the full +107 volts is coupled to horizontal output circuit 35, large currents will flow in the windings of transformer 39 and in high voltage circuit 40 in order to charge the initially discharged capacitor of the kinescope capacitance. These large currents may cause component failures. The component values of the circuit of the FIGURE are selected such that horizontal deflection circuit 50 begins to operate before the voltage at terminal E has reached its full +107 volts.

For example, an AC line filter capacitor, which is suitable for providing a continuous steady-state operating voltage to the horizontal deflection circuit, is typically of relatively large value in order to filter out the line frequency ripple. The line filter capacitor 42 of the invention, however, need not greatly filter the AC line ripple, as the operating voltage developed across it is used only during the initial start-up inrush interval. In fact, if too large a value is selected for capacitor 42, the voltage developed during the initial inrush interval will be too low for proper operation.

It should be noted, that inductor 33a need not provide any significant filtering of the pulsating direct current potential at terminal B. Capacitor 32 is the primary filter, and any remaining ripple can be removed by voltage regulator 34. Inductor 33a may be of relatively low value, such as 1 millihenry. Values of other significant components are: capacitor 51, 470μf; capacitor 48, 4.7μf; capacitor 42, 22μf.

Because power transformers are relatively costly and bulky, switch 21 is directly coupled to bridge rectifier 23 instead of through a secondary winding of a power transformer. Inductors 33a and 33b isolate from the AC line those circuits which obtain their operating voltages from the inrush current. Thus, the chassis ground is not in common with the AC line neutral terminal. This arrangement reduces the possibility of shock hazards.

What is claimed is:

1. A start-up circuit for a television receiver, comprising:
   first rectifying means responsive to a source of first alternating current voltage for providing a pulsating direct current voltage;
   filter means coupled to said rectifying means for providing a first direct current voltage and in which an inrush current flows during an initial interval;
   a first inductor coupled in the path of said inrush current, the time rate of change of said inrush current developing a second alternating current voltage across said first inductor during said initial interval;
   a deflection circuit; and
   first means coupled to said first inductor and responsive to said second alternating current voltage for developing a second direct current voltage suitable for operating said deflection circuit during said initial interval.

2. A start-up circuit according to claim 1 wherein said deflection circuit begins operation before said first direct current voltage has reached a steady-state value.

3. A start-up circuit according to claim 1 wherein said deflection circuit provides a third direct current voltage replacing said second direct current voltage after said initial interval has elapsed.

4. A start-up circuit according to claim 3 wherein said first means includes a rectifier diode which is reversed biased after said initial interval has elapsed.

5. A start-up circuit according to claim 4 wherein said deflection circuit comprises a horizontal deflection circuit and includes second means for generating a third alternating current voltage and second rectifying means for providing said third direct current voltage after said initial interval has elapsed.

6. A start-up circuit according to claim 5 wherein said second means includes a horizontal output transformer and a secondary winding coupled to said horizontal output transformer across which said secondary winding said third alternating current voltage is developed.

7. A start-up circuit according to claim 6 wherein said first means includes a second inductor magnetically coupled to said first inductor for developing said second direct current voltage.

8. In a television receiver, a start-up power supply, comprising:
   first rectifying means responsive to a source of first alternating current potential for providing a pulsating direct current potential;
   filter means coupled to said rectifying means for providing a first direct current potential and in which an inrush current flows during an initial interval;
   a first inductor, in which said inrush current flows, coupled to said filter means;
   a second inductor magnetically coupled to said first inductor, the time rate of change of said inrush current in said first inductor developing a second alternating current potential in said second inductor during said initial interval;
   a horizontal deflection circuit; and
   first power supply means coupled to said second inductor for providing during said initial interval a first operating potential of sufficient magnitude for use by said horizontal deflection circuit.

9. A start-up power supply according to claim 8 wherein said horizontal deflection circuit includes:
   a horizontal output transformer;
   a secondary winding coupled to said horizontal output transformer; and
   second power supply means coupled to said secondary winding and responsive to the voltage generated in said secondary winding for providing a second operating potential in place of said first operating potential after said initial interval has elapsed.

10. A start-up power supply according to claim 9 wherein said first power supply means includes a first diode rectifier which is reverse biased after said initial interval has elapsed.

11. A start-up supply according to claim 10 wherein said second power supply includes a second diode rectifier poled for providing a second operating potential.

* * * * *

Disclaimer

4,127,875.—*Ronald E. Fernsler; John C. Peer* and *David W. Luz,* Indianapolis, Ind. INRUSH CURRENT START-UP CIRCUIT FOR A TELEVISION RECEIVER. Patent dated Nov. 28, 1978. Disclaimer filed Mar. 5, 1982, by the assignee, *RCA Corp.*

Hereby enters this disclaimer to all claims of said patent.

[*Official Gazette May 25, 1982.*]